United States Patent
Frey et al.

(10) Patent No.: US 10,789,075 B2
(45) Date of Patent: Sep. 29, 2020

(54) METHOD AND APPARATUS FOR SECURITY CERTIFIED SMART CARD OS DIVERSIFICATION SYSTEM

(71) Applicant: NXP B.V., Eindhoven (NL)

(72) Inventors: Alexandre Frey, Hamburg (DE); Josef Fruehwirth, Hamburg (DE); Andreas Lessiak, Graz (AT)

(73) Assignee: NXP B.V., Eindhoven (NL)

( * ) Notice: Subject to any disclaimer, the term of this patent is extended or adjusted under 35 U.S.C. 154(b) by 405 days.

(21) Appl. No.: 15/719,616

(22) Filed: Sep. 29, 2017

(65) Prior Publication Data
US 2019/0102205 A1    Apr. 4, 2019

(51) Int. Cl.
G06F 9/445     (2018.01)
H04L 9/32      (2006.01)
G06F 21/57     (2013.01)

(52) U.S. Cl.
CPC .......... *G06F 9/44505* (2013.01); *G06F 21/57* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 2006/0282899 A1 | 12/2006 | Raciborski | |
| 2013/0014256 A1* | 1/2013 | Krizenecky | G06F 21/54 726/23 |
| 2015/0113266 A1 | 4/2015 | Wooten et al. | |
| 2017/0220782 A1* | 8/2017 | Alsanousi | G06F 21/126 |
| 2019/0156029 A1* | 5/2019 | Ashey | H04L 63/1466 |
| 2019/0272377 A1* | 9/2019 | Eckardt | H04W 12/0027 |

OTHER PUBLICATIONS

Courbot, A. et al. "Romization: Early Deployment and Customization of Java Systems for Constrained Devices", Construction and Analysis of Safe, Secure, and Interoperable Smart Devices, Second International Workshop, CASSIS 2005, 182 pgs. retrieved from the internet Feb. 14, 2019 at: URL:https://link.springer.com/content/pdf/10.1007/11741060.pdf (Dec. 31, 2006).

"Security Target for Java Card Platform Implementation for Infineon on SLE 78 (SLJ 52GxxyyyzR) V1.0", Oracle, 158 pgs, retrieved from the internet: https://www.commoncriteriap.

* cited by examiner

*Primary Examiner* — Fahmida Rahman

(57) ABSTRACT

Various embodiments relate to a method and apparatus for embedding an operating system in a smart card product, which is certified and which derives multiple variants from the operating system, the method including the steps of certifying, a target of evaluation, the target of evaluation including an OS core mask and a plurality of components which includes OS components and plugin placeholders, building, by an image builder tool, romized content and runtime content including at least one of the plurality of components and customizing which of the plurality of components to include on the smart card product.

17 Claims, 2 Drawing Sheets

METHOD AND APPARATUS FOR SECURITY CERTIFIED SMART CARD OS DIVERSIFICATION SYSTEM

TECHNICAL FIELD

This disclosure relates generally to a diversification system for Smart-Card products, and more specifically, but not exclusively, to certifying an operating system and deriving multiple derivatives without recertifying.

BACKGROUND

The market for smart-card products with an operating system, such as JavaCard Open Platform ("JCOP") has become more diversified and there is a need to address a growing diversity of usages within these markets.

At the same time, certification requirements have also become stricter and more diverse as there are different certification schemes for different markets.

This diversification and large number of different certifications creates a growing challenge as even small modifications in the smart-card software require increased re-certification cost and time.

SUMMARY OF EXEMPLARY EMBODIMENTS

A brief summary of various embodiments is presented below. Embodiments address the need to create a method and apparatus for a single operating system which is certified and where multiple variants can be derived from the operating system without requiring additional memory and without requiring re-certification.

In order to overcome these and other shortcomings of the prior art and in light of the need to create a single operating system which is certified and where multiple variants can be derived from the operating system without requiring additional memory and without requiring re-certification, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for embedding an operating system ("OS") in a smart card product, which is certified and which derives multiple variants from the operating system, the method including the steps of certifying, a target of evaluation, the target of evaluation including an OS core mask and a plurality of components which includes OS components and plugin placeholders, building, by an image builder tool, romized content and runtime content including at least one of the plurality of components and customizing which of the plurality of components to include on the smart card product.

In an embodiment of the present disclosure, the customizing of which of the plurality of components to include in the runtime content is performed by a user.

In an embodiment of the present disclosure, the plurality of components are stored in virtual memory.

In an embodiment of the present disclosure, the method for embedding the operating system further including allowing, by a registry in the romized content and the runtime content, the OS to determine whether the at least one of the plurality of components is present in the romized content and the runtime content.

In an embodiment of the present disclosure, the OS is configured to generate an error code when the at least one of the plurality of components is absent from the romized content and the runtime content.

In an embodiment of the present disclosure, the method for embedding the operating system further including allowing the OS, by using a jump table, to call the at least one of the plurality of components.

In an embodiment of the present disclosure, the method for embedding the operating system further including storing, the plugin placeholders, which are included in the registry and the jump tables, in the target of evaluation, for a plurality of plugin components.

In an embodiment of the present disclosure, the OS includes a cryptographic hash for each of the plurality of components.

In an embodiment of the present disclosure, the OS is configured to determine, using the cryptographic hash, whether at least one of the plurality of components is certified.

In an embodiment of the present disclosure, a JavaCard firewall is used by the operating system when implementing the plurality of plugin components.

Various embodiments described herein relate to a security product embedding an operating system which is certified and which derives multiple variants the operating system, the operating system including a target of evaluation configured to include an OS core mask and a plurality of components which includes OS components and plugin placeholders, which are certified, an image builder tool configured to build romized content and runtime content including at least one of the plurality of components and customizing which of the plurality of components to include on the smart card product.

In an embodiment of the present disclosure, the customizing of which of the plurality of components to include in the runtime content is performed by a user.

In an embodiment of the present disclosure, the plurality of components are stored in virtual memory.

In an embodiment of the present disclosure, the security product embedding an operating system, further including a registry, in the romized content and the runtime content, configured to allow the OS to determine whether the at least one of the plurality of components is present in the romized content and the runtime content.

In an embodiment of the present disclosure, the OS is configured to generate an error code when the at least one of the plurality of components is absent from the romized content and the runtime content.

In an embodiment of the present disclosure, the security product embedding an operating system, further including a jump table configured to allow the OS to call the at least one of the plurality of components.

In an embodiment of the present disclosure, the security product embedding an operating system, further including the plugin placeholders configured to be stored in the registry and the jump tables in the target of evaluation for a plurality of the plugin components.

In an embodiment of the present disclosure, the OS includes a cryptographic hash for each of the plurality of components.

In an embodiment of the present disclosure, the OS is configured to determine, using the cryptographic hash, whether at least one of the plurality of components is certified.

In an embodiment of the present disclosure, a JavaCard firewall is used by the operating system when implementing the plurality of plugin components.

In an embodiment of the present disclosure, the plurality of plugin components are used for an embedded integrated circuit card ("eUICC") framework implementation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
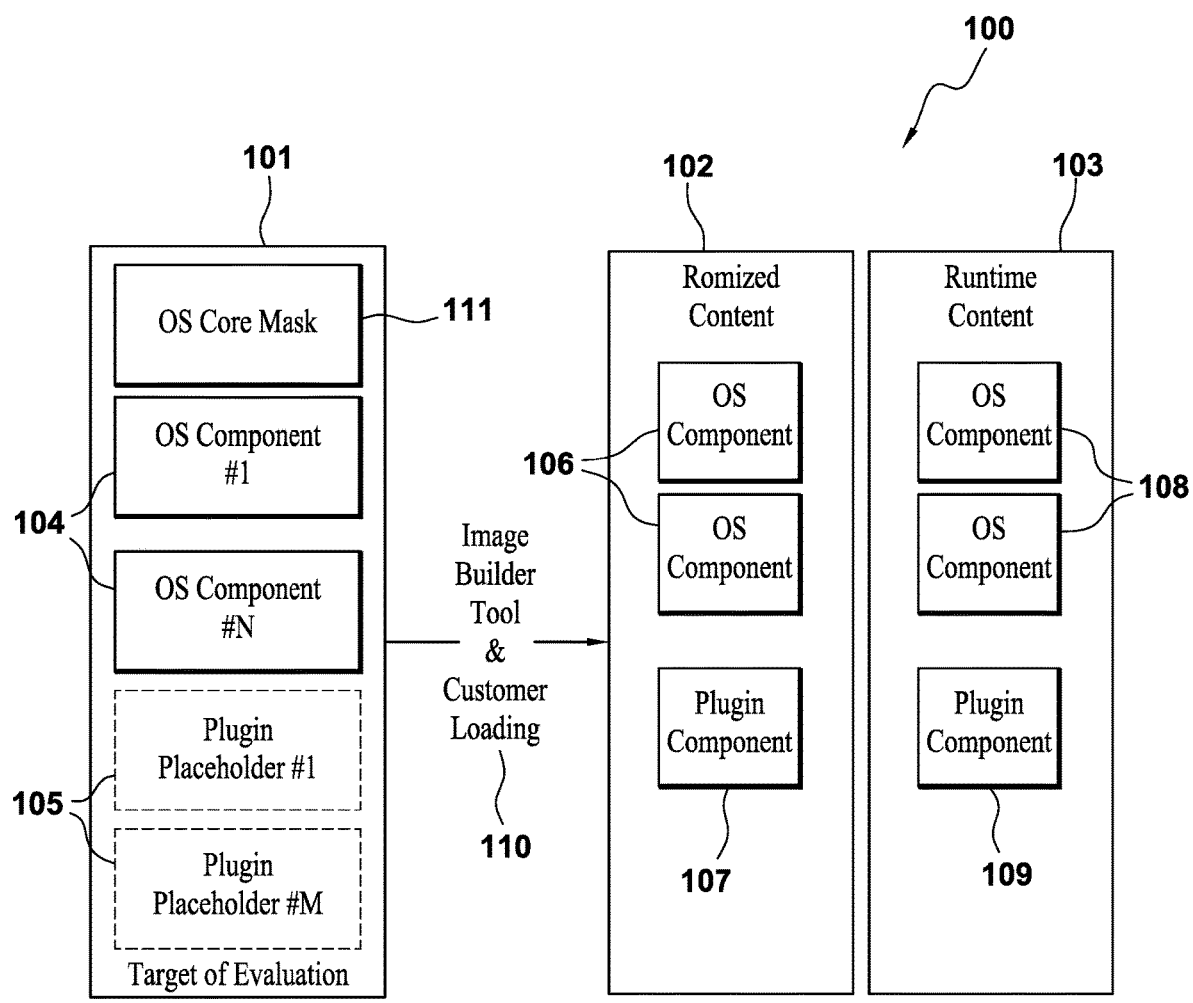
FIG. 1 illustrates a block diagram of code for a JCOP product.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

These embodiments address the need to create a method and apparatus for a single operating system which is certified and where multiple variants can be derived from the certified operating system without requiring additional memory and without requiring re-certification.

A smart-card includes products such as mobile Secure Elements ("SE"), SIM Cards (in particular when including an embedded Universal Integrated Circuit Card ("eUICC"), banking cards, passports, IoT devices, and cars).

Typical use cases which require smart-cards include mobile payment using NFC technology, payment cards, authentication applications, passports, wireless authentication, subscription management, vehicle to vehicle or infrastructure secure communication, and the corresponding content management of these applications.

Smart-Card products have stringent security requirements which can lead to costly and lengthy certification processes, such as Eurocard, MasterCard and Visa ("EMVCo"), Common Criteria, MasterCard Transaction Payment Services ("MIPS") and Federal Information Processing Standard ("FIPS"), among others.

These embodiments address the problem of associated memory cost of multiple OS components and recertification each time a new OS component is required by allowing the production and certification of a single smart-card product and the subsequent creation of multiple variants without requiring full recertification of the JCOP product and all the applications depending on it. Furthermore, the disclosure allows some components (e.g., "plugin components") to be provisioned after the certification.

JCOP products are secure element smart-card products embedding an operating system based on the JavaCard technology.

The benefit of JavaCard technology is the ability to deploy hardware-independent applications ("applets") due to the JavaCard standard virtual machine, APIs and application file format.

JavaCard technology allows JCOP products to certify the hardware and software platform once and separately certify each application (i.e., applet-on-platform composite certification concept). This composite certification is critical to keep certification costs and time-to-market costs lowered.

However, due to the diversity of markets, this approach of composite certification (i.e., separating the market specificities in applets only) is insufficient.

Therefore, it is necessary to diversify the features within the operating system to be tailored per market or even per individual customers and furthermore, in telecom and IoT, there is a need to integrate features from third-party partners.

Presently, due to the diversity of markets, either multiple tailored products per market are created which dramatically increases the certification costs as any change or customization of the base operating system of a smart card product means recertification of the product and all associated applications.

Alternatively, when creating a one-fit-all product with all features increases product size which requires a large amount of memory, which increases the cost.

The current disclosure solves the issue of having to either recertify the JCOP product for every product or create a one-fit-all JCOP product, by producing a single JCOP product, certifying it once and deriving multiple variants and options tailored to markets or customers without incurring the associated memory cost and allowing the addition of features to the JCOP product without requiring recertification.

The current disclosure derives multiple derivative JCOP products from a single certified base and adds, after the certification, features that are not certified or certified separately (i.e., plugin components).

As discussed, JCOP products are using the JavaCard technology. JavaCard technology is based on a Java virtual machine ("JVM") executing bytecode instruction, which allows writing applications and OS code in a portable way, independent of the underlying hardware platform.

FIG. 1 illustrates a block diagram of the code of a JCOP product 100. The implementation of a JavaCard OS splits the Random Access Memory ("ROM") and Flash memory into three parts, namely, the Target of Evaluation 101, Romized Content 102, and Runtime Content 103.

The OS Core Mask 111 is monolithic as the compilation generates a single OS Core Mask 111 containing all the OS code (i.e., native code and Java bytecode).

The OS Core Mask 111 is either placed in ROM or Flash memory and is subject to certification.

The Romized Content 102 is customer-specific applications which can be "romized" by using an image builder tool 110 that generates a "romized content" image.

The "Global Platform" standard may be used to manage the content. For example, load new applications.

The applications themselves will generate Java objects. These Java objects will be stored in Runtime Content 103, which is in writable memory (e.g., Flash). Runtime Content 103 may also be a Persistent Heap ("PHEAP").

The JCOP product organizes the code as a collection of components that can go in the Romized Content 102 or in the Runtime Content 103.

For example, the Target of Evaluation 101 may include OS Components 104 and Plugin Placeholders 105. The Romized Content 102 may include OS Component 106 and Plugin Component 107. The Runtime Content 103 may include OS Components 108 and Plugin Component 109.

This allows the image builder tool 110 to include OS Components 104 in the Romized Content 102 and load OS Components 108 in the Runtime Content 103.

By including OS Components 104 in the Romized Content 104 and loading OS Components 108 in the Runtime Content 103, a single simultaneous certification of the OS and all its optional components is permitted.

The separation of the OS into multiple components is modularization of the OS. The OS components correspond to OS features that may be absent in some configurations, as not all OS components are needed at all times. For example, OS components for asymmetric key generation, support for Elliptic Curve Cryptography ("ECC"), and support for sophisticated content management (Delegated Management) may not be needed at all times.

The OS components (besides the core OS mask) are made "position-independent" (i.e., may be placed at any address in the memory without changing their binary content). For native code, this may be achieved by compiling into binary code that uses only relative references with no dependency on the actual address where the code resides. Java code is position-independent because it may not depend on CPU instructions and memory, but relies on a virtual instruction set. However, an alternative technique may be to use virtual memory to allow OS components to be added or deleted post-certification. A fixed address for each component is determined when the OS is built and hardware support (i.e., Memory Management Unit ("MMU")) may be used to virtually erase part of this memory map, without spending memory.

A registry of all components is stored in the Romized Content 102 and in the Runtime Content 103. This registry allows the OS to dynamically determine if a component is present or not and, if present, how to call the component functions using the jump tables. The OS code is then organized to react to the absence of a component by generating error codes or exceptions.

When the OS and all OS components are built, the OS Core Mask 101 may contain a cryptographic hash of all the individual loadable OS components (i.e., fingerprints). The cryptographic hash will allow the core OS to determine whether a loaded or romized OS component is certified.

Some components are unknown when the OS is built and certified. "Placeholders" are built in the OS for "plugin" components 105 and they are represented in the registries and jump tables.

The OS is prepared for multiple plugin components but the plugin components may be provided after the certification and may be created and loaded by a third-party.

In this case, the OS may require a stricter defense against the plugin component in order to prevent uncertified content from harming the security of the system. The stricter defense may be achieved by making plugin components implemented as Java applets using the standard JavaCard firewall protection.

For example, a particularly significant application of plugin components is for the eUICC market as in this market the OS must provide a "UICC framework" with deep inter-dependencies with the OS that does not fit the limited applet model.

Traditionally, this meant that the OS and UICC framework had to be built and certified together. However, with the current disclosure, the OS may be organized to represent the UICC framework as a plugin component.

Therefore, the OS Core Mask and the UICC framework placeholders can be certified before when the UICC framework is not yet available and the OS certification can then immediately be used for products outside of the eUICC market (e.g., eSE, payment) and for these products, there is minimal memory cost for the UICC framework, except for the small placeholder.

The OS Core Mark may be prepared for multiple providers of the UICC framework and the UICC framework may be even loaded in the field which is possible because it is an unprivileged component, not trusted by the OS.

The current disclosure is applicable to payment and ID markets (e.g., payment, SecID) where there is a large number of customers each requiring slightly different feature set. The current disclosure may be applied to build and certify a single JCOP product and derive customer-specific products by removing some of the features (e.g., ECC cryptography, asymmetric key generation, some complex aspects of card content management).

Figure 2:
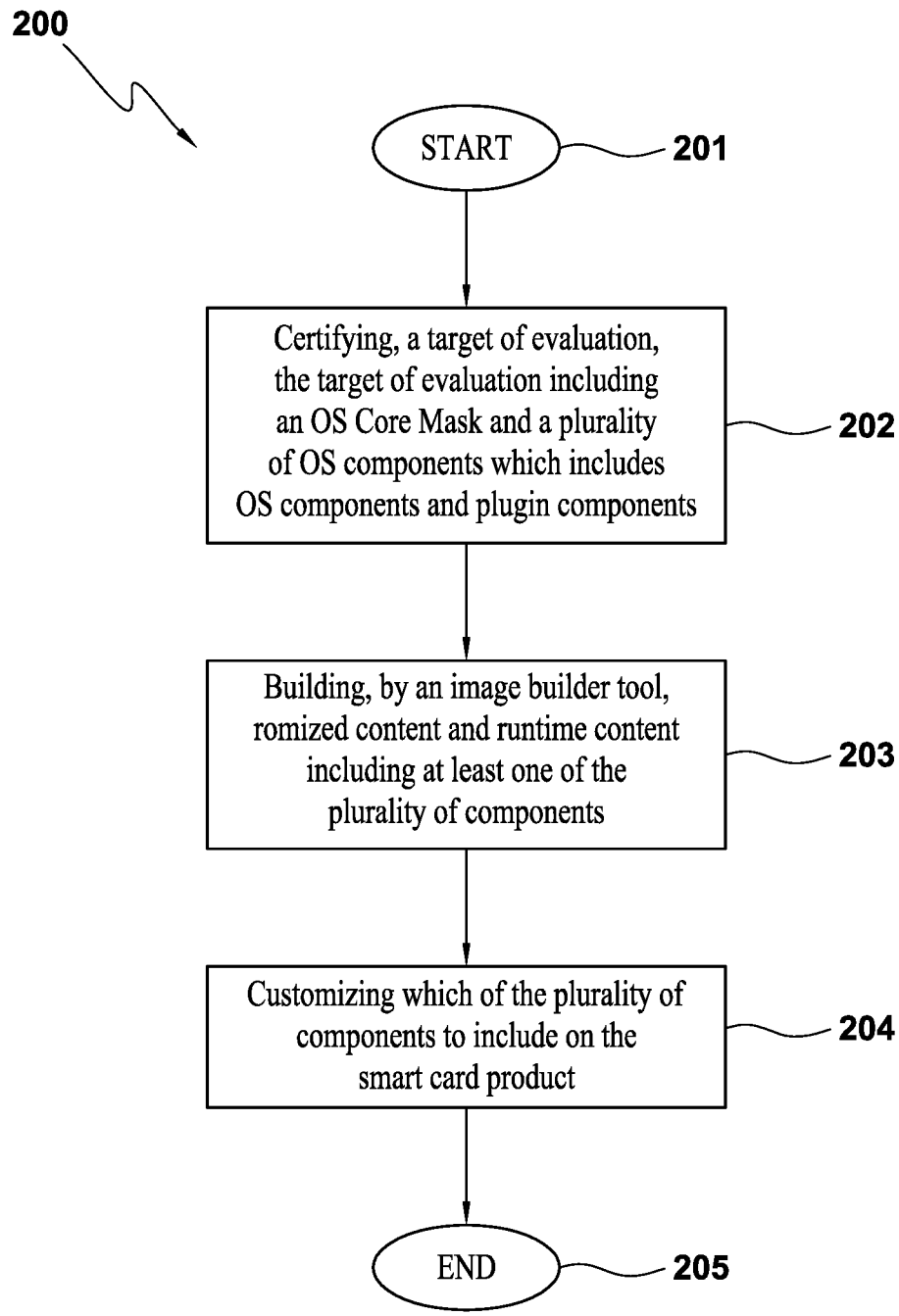
FIG. 2 illustrates a flow diagram of a method for a single operating system which is certified and where multiple variants can be derived from the operating system without requiring additional memory and without requiring re-certification.

FIG. 2 illustrates a flow diagram of a method 200 for embedding an operating system in a product, which is certified and which derives multiple variants from the operating system.

The method 200 begins at step 201.

The method 200 proceeds to step 202 which certifies, a target of evaluation, the target of evaluation including an OS core mask and a plurality of components which includes OS components and plugin placeholders.

The method 200 proceeds to step 203 which builds, by an image builder tool, romized content and runtime content including at least one of the plurality of components.

The method 200 proceeds to step 204 which customizes which of the plurality of components to include on the smart card product.

The method 200 then proceeds to end at step 205.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for embedding an operating system ("OS") in a smart card product, the method comprising the steps of:
    certifying a target of evaluation, the target of evaluation including an OS core mask and a plurality of components which includes OS components and plugin placeholders;
    building, by an image builder tool, romized content and runtime content including at least one of the plurality of components;
    determining by the OS via a registry in the romized content and the runtime content, whether the at least one of the plurality of components is present in the romized content and the runtime content;
    wherein the OS is configured to call, by using a jump table the at least one of the plurality of components
    customizing which of the plurality of components to include on the smart card product; and
    embedding the OS on the smartcard product based on customizing which of the plurality of components to include on the smartcard product.

2. The method for embedding the operating system of claim 1, wherein the customizing of which of the plurality of components to include in the runtime content is performed by a user.

3. The method for embedding the operating system of claim 1, wherein the plurality of components are stored in virtual memory.

4. The method for embedding the operating system of claim 1, wherein the OS is configured to generate an error code when the at least one of the plurality of components is absent from the romized content and the runtime content.

5. The method for embedding the operating system of claim 1, further comprising:
    storing, the plugin placeholders, which are included in the registry and the jump tables, in the target of evaluation, for a plurality of plugin components.

6. The method for embedding the operating system of claim 1, wherein the OS includes a cryptographic hash for each of the plurality of components.

7. The method for embedding the operating system of claim 6, wherein the OS is configured to determine, using the cryptographic hash, whether at least one of the plurality of components is certified.

8. The method for embedding the operating system of claim 5, wherein
    a JavaCard firewall is used by the operating system when implementing the plurality of plugin components.

9. A security product embedding an operating system, the operating system stored on a non-transitory machine-readable storage medium, the operating system comprising:
    a target of evaluation configured to include an OS core mask and a plurality of components which includes OS components and plugin placeholders, which are certified;
    an image builder tool configured to build romized content and runtime content including at least one of the plurality of components, and
    a jump table configured to allow the OS to call the at least one of the plurality of components,
    wherein the image builder tool is configured to customize which of the plurality of components to include on a smart card product, wherein the OS is configured to generate an error code when the at least one of the plurality of components is absent from the romized content and the runtime content.

10. The security product embedding an operating system of claim 9, wherein the customizing of which of the plurality of components to include in the runtime content is performed by a user.

11. The security product embedding an operating system of claim 9, wherein the plurality of components are stored in virtual memory.

12. The security product embedding an operating system of claim 9, further comprising:
    a registry, in the romized content and the runtime content, configured to allow the OS to determine whether the at least one of the plurality of components is present in the romized content and the runtime content.

13. The security product embedding an operating system of claim 9, further comprising:
    the plugin placeholders configured to be stored in the registry and the jump tables in the target of evaluation for a plurality of the plugin components.

14. The security product embedding an operating system of claim 9, wherein the OS includes a cryptographic hash for each of the plurality of components.

15. The security product embedding an operating system of claim 14, wherein the OS is configured to determine, using the cryptographic hash, whether at least one of the plurality of components is certified.

16. The security product embedding an operating system claim 9, a JavaCard firewall is used by the operating system when implementing the plurality of plugin components.

17. The security product embedding an operating system of claim 9, wherein the plurality of plugin components are used for an embedded integrated circuit card ("eUICC") framework implementation.

\* \* \* \* \*